Patented Dec. 12, 1933

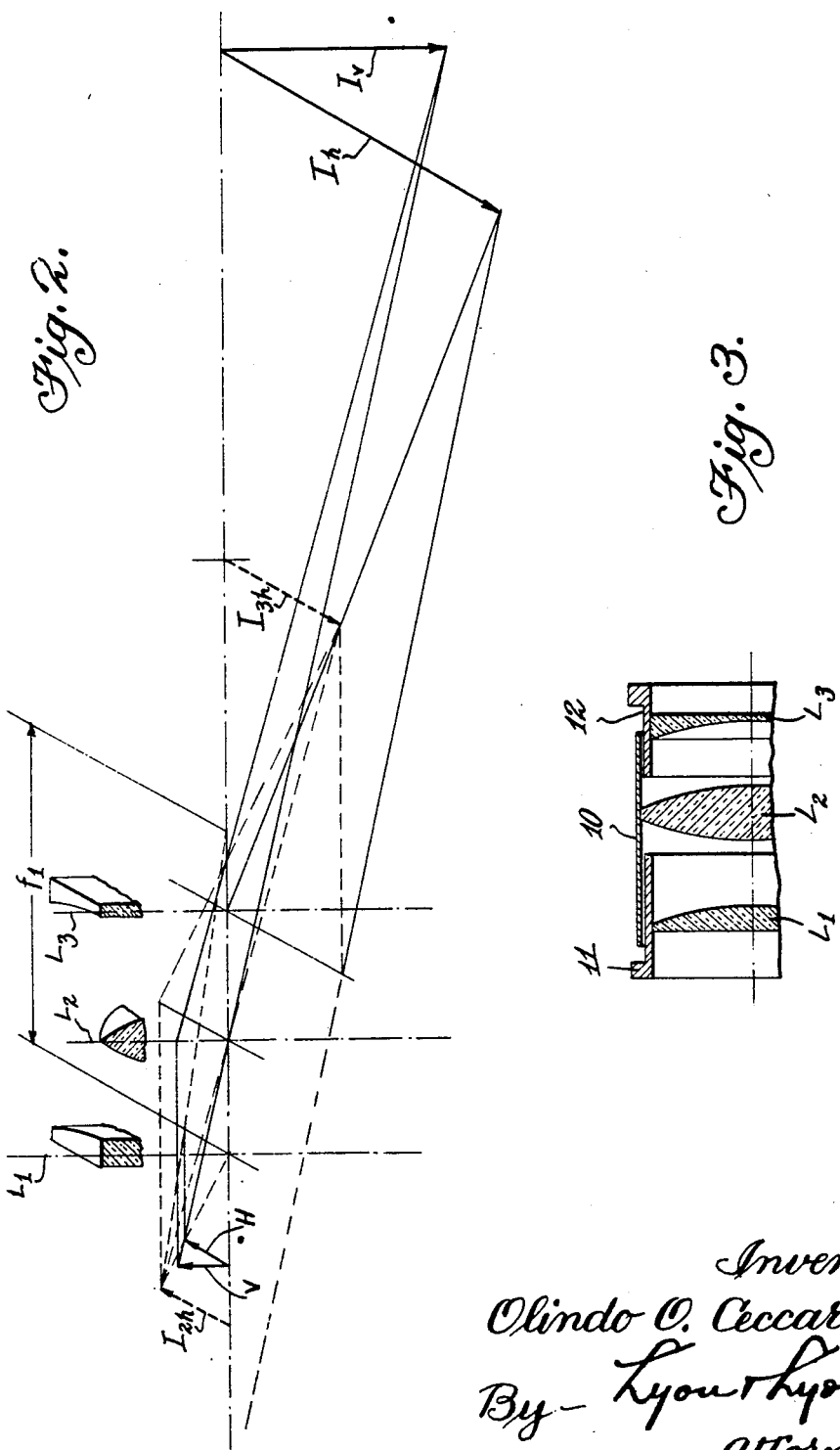

1,938,808

UNITED STATES PATENT OFFICE 1,938,808

OPTICAL SYSTEM FOR PHOTOGRAPHIC PURPOSES

Olindo O. Ceccarini, Beverly Hills, Calif., assignor to Metro-Goldwyn-Mayer Corporation, Culver City, Calif., a corporation of New York Application December 15, 1930. Serial No. 502,330

4 Claims. (Cl. 88—24)

In the art of motion picture photography, a need has been felt for an optical system by means of which photographic images could either be condensed or enlarged unequally along axes substantially at right angles to each other. Although optical systems capable of distorting photographic images have been alluded to in a general manner previously, no one has actually described or constructed an optical system capable of producing this result. The use of cylindrical lenses in such systems has been also suggested but no satisfactory optical system employing cylindrical lenses has been disclosed heretofore.

In order to be adaptable for use in optical printing of photographic images and in the projection of photographic images, an optical system must be extremely accurate. All components, such as horizontal and vertical components of the object must form photographic images which are clear cut and in focus in the same plane transverse to the optical axis. Aberration should be reduced to a minimum. Distortion other than that desired should not be present. For example, when a rectangular negative is to be printed so as to form a square positive, such positive must be sufficiently clear and accurate so that it may be projected and again expanded during projection so as to form a clear, definite and brilliant image on the screen.

Heretofore it has been impossible to project photographic images through lens systems employing cylindrical lens components as the horizontal component of the object would be represented by an actual image in one plane transverse to the optical axis whereas the vertical component of the object would form an actual image in another transverse plane.

In other words, the horizontal and vertical components of the object being projected, for example, would not appear simultaneously in a single plane but instead two images would be formed, each image lying in a separate plane. Obviously, if the vertical components are in an actual image in one plane whereas the horizontal components are in a different plane, it is impossible to reconstruct another image at one time.

It is to be understood that the terms "horizontal" and "vertical" components of the object and/or image, refer to any components angularly related to each other, assumption being made, for facility of explanation and understanding only that these components are substantially at right angles to each other and extend vertically and horizontally.

This invention particularly relates to an optical system by means of which complete images of objects may be reconstructed, such reconstructed images differing from the object in relative proportions along axes substantially at right angles to each other.

Furthermore, the optical system of this invention reconstructs images in the same transverse plane, thus permitting the production of images which are definite, clear and brilliant.

An object of this invention is to disclose and provide an optical system adapted to produce images of objects, said images being magnified or reduced unequally along axes angularly disposed to each other.

Another object is to disclose and provide an optical system adapted to produce images of objects, said images being magnified or reduced unequally along axes angularly disposed to each other, said optical system being corrected for line imagery.

Further purposes, objects, uses and advantages of this invention will become apparent to those skilled in the art from the following detailed description of certain embodiments of the invention. In describing the invention, reference will be had to the appended drawings, in which:

Fig. 2 is a geometric representation of a lens system for use in the projection of photographic images (of deformed character) in undistorted form upon a screen or the like for exhibition purposes.

Fig. 3 is a longitudinal section through one form of lens mount in which the optical systems of this invention may be carried.

Figure 1:
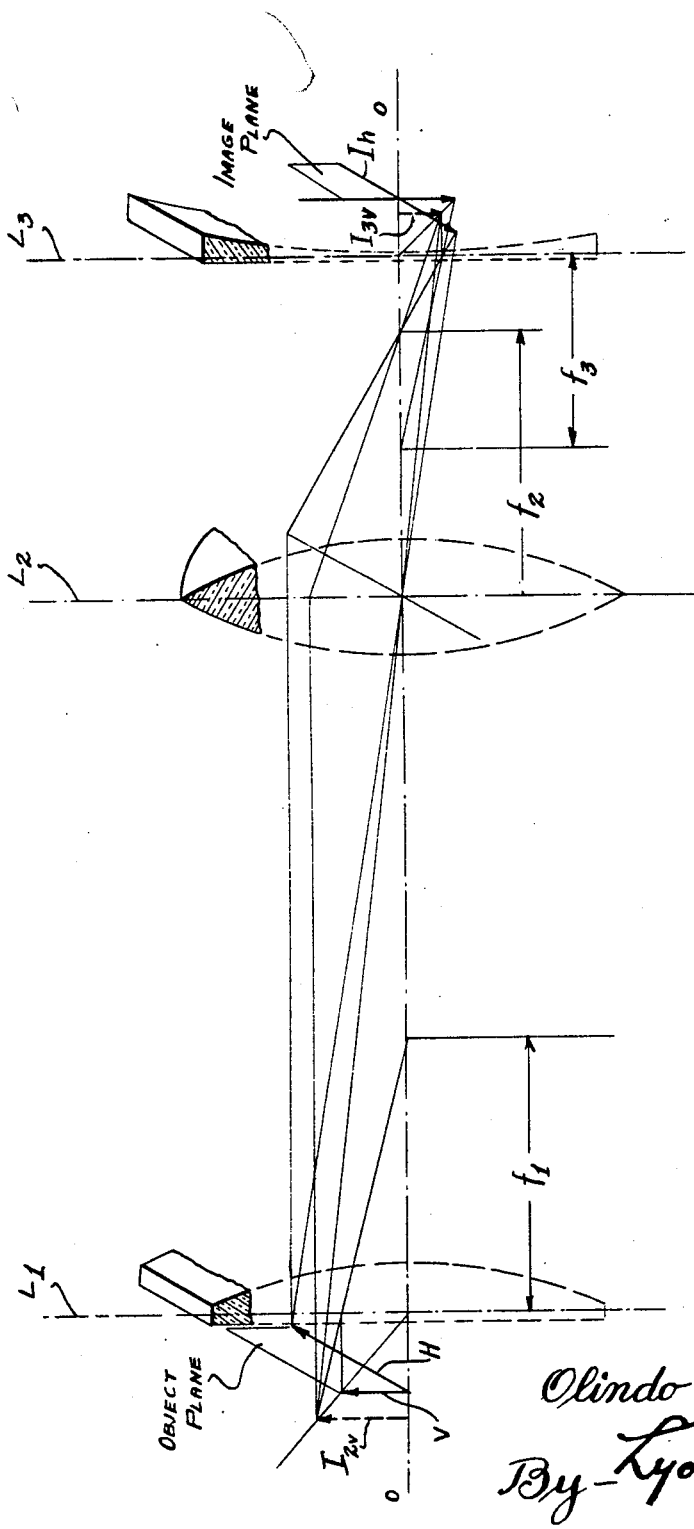
Fig. 1 is a geometric representation of an optical lens system for use in printing photographic images by optical projection.

The optical systems of this invention may be employed, as has been stated hereinabove, in printing operations or for the projection of photographic images for exhibition purposes.

Optical systems of the character described hereinabove may be used to great advantage in the motion picture industry. For example, the motion picture play or scene may be photographed on a 70 millimeter or other large film so as to give a large negative picture of desired proportions. When a 70 millimeter film is employed, the picture is about 1.89 x 0.91 inches. From an operating standpoint, the cameras normally employed on 35 millimeter films can not be used for 70 millimeter films so that new camera equipment must be employed by the motion picture producer. This, however, is not a particularly great drawback. If, however, positives are printed from the 70 millimeter negatives, such positives also being printed on 70 millimeter film by contact, then it is necessary that every theatre be provided with new projection equipment adapted to receive and run 70 millimeter film. This would necessitate tremendous expenditures of money as every theatre would have to be provided with at least two projection machines.

Furthermore, it would necessitate retention of the 35 millimeter projectors for other films, such as newsreels made on the 35 millimeter film. In accordance with the process of this invention, however, the 70 millimeter negatives may be printed by optical projection and be of use in an optical system such as is shown in Fig. 1 so that the entire subject matter of a negative picture measuring 1.89 x 0.91 is placed on an area measuring about 0.94 x 0.72 on the standard 35 millimeter film.

If desired, the positive picture may be squeezed even further so as to assume the size of only 0.84 x 0.72, thereby allowing $\frac{1}{10}$ inches for the sound record.

In order to print the picture area of the 70 millimeter film upon the picture area of a 35 millimeter film, therefore, the width of the picture is to be reduced from 1.89 to 0.94 (a reduction of 50% of the size of the original negative) whereas the height of the original negative picture must be reduced from 0.9125 to 0.723, (a reduction of only about 8%).

This condensed 35 millimeter positive film may then be projected through an optical system such as is shown in Fig. 2, for example, so as to produce a projected image measuring approximately 15 feet by 30 feet, or at least having the proportions of two to one in width to height, such being the proportions of the original negative picture originally taken. In thus enlarging the 35 millimeter positive, no definition is lost for the following reason: the negative film in order to have photographic speed, has a relatively coarse grain size but the positive film may have an extremely fine grain size. By optically printing the negative upon the positive, the grain size of the negative is reduced and does not become apparent when the images carried by the positive film are subsequently enlarged. In other words, the positive film is more efficiently utilized and this process permits the projection of larger images from a 35 millimeter film than has heretofore been thought possible.

By means of such process, therefore, it is not necessary to change the projector movement in the theatres so as to permit the exhibition of pictures on screens having a ratio of width to height of say two to one, but instead any ordinary projector machine may be equipped with an optical system capable of projecting the deformed positives so as to completely fill a screen having proportions other than the proportions of the picture on the positive.

Although reference has been made repeatedly hereinabove to 35 and 70 millimeter film and to picture areas of specific sizes, it is to be understood that this invention is not limited to any particular size of film picture area or proportions. Optical systems of this invention are applicable wherever it is desired to unequally expand or contract images and where definition, clarity and brilliance of the resulting images is required.

In general, the optical system for use in printing comprises a positive cylindrical lens, a spherical camera lens, and a negative cylindrical lens, the spherical lens being placed between the two cylindrical lenses. Furthermore, the two cylindrical lenses have their axes of curvature lying in the same longitudinal plane through the optical axis. The path of light during a printing operation is through the positive cylindrical lens, then through the spherical lens, and finally through the negative cylindrical lens. These three lenses are arranged relatively to each other in such manner that for minor subsequent adjustments for focusing, they are movable as a body.

In assembling the lens system, the following procedure may be employed. A spherical lens is used capable of covering the entire field of the negative which will be printed. Given the size of the negative and knowing the size of the desired positive, the location of the negative or object plane and the image plane is easily determined with respect to the position of the spherical lens.

The positive cylindrical lens to be used should have a focal length sufficiently large so that the negative or object plane can be within a practical distance of such positive cylindrical lens. If this distance is too large, the entire optical system becomes too long. If the focal length of the positive cylindrical lens is very short, however, then it will be found that the focal length of the negative cylindrical lens becomes too short. The focal length of the positive cylindrical lens must be such as to properly cover the object field or negative. For ordinary cinematographic work, it has been found that a positive cylindrical lens having a focal length of about 3.5 inches gives satisfactory results. The positive cylindrical lens is preferably placed with its plane surface toward the object so as to form a virtually enlarged image of the vertical components of the object. The axis of curvature of the positive cylindrical lens will therefore be parallel to the horizontal components of the object.

The distance between the positive cylindrical lens and the spherical lens, therefore, depends upon the amount of magnification which it is desired to impart to the vertical components of the image. For ordinary purposes, such magnification need not exceed about 50 percent. After the focal length of the positive cylindrical lens has been assumed, then the location of such lens from the spherical lens and from the object is easily determined. The spherical lens will therefore pick up the original horizontal components of the object and the enlarged vertical components of the object and reduce both of these components equally.

Inasmuch as the object is in one plane and the enlarged virtual image of the vertical components is in another plane, the spherical lens will form actual images in different transverse planes. The horizontal components of the object will be shown in an actual image in one plane whereas the vertical components (which the spherical lens has obtained from the virtual image created by the positive cylindrical lens) will lie in another transverse plane.

In order to correct this double line imagery, a negative cylindrical lens is positioned between the image plane and the spherical lens. The size of the actual image of the vertical components may be graphically determined. The image plane is known and the size of the actual image of vertical components which it is desired to produce, is also known. From these factors the location of the negative cylindrical lens may be graphically determined. It is to be understood that the negative cylindrical lens is to have its axis of curvature transverse to the optical axis and in a plane passing through the axis of curvature of the positive cylindrical lens.

The point of intersection of a parallel beam of light from the spherical lens to the actual image of vertical components (as formed by the spherical lens) will intersect the negative cylindrical lens. A line joining this point with the limiting height of the vertical components in the image plane will intersect the optical axis, thus providing means for determining the focal length of the negative cylindrical lens.

In practice it has been found that the focal point of the negative cylindrical lens falls within the optical system and between the positive cylindrical lens and the spherical lens. The relative focal lengths of the positive cylindrical lenses, however, vary with amount of reduction which it is desired to make in the vertical components of the object.

The negative cylindrical lens enlarges the actual image of vertical components as produced by the spherical lens and furthermore transposes such actual image of vertical components into the plane in which the horizontal components of the object are imaged by the spherical lens.

It has been found that after the total image has been reduced in both axes equally as by a spherical lens, such image can not be enlarged or reduced in one axis alone without forming such line image in a plane differing from the plane of the other axis. By the optical system described hereinabove, however, an enlargement is first made in one axis or in one component and this enlarged component then reduced and finally increased again until it is of the proper size.

Fig. 1 graphically illustrates an optical system embraced by this invention, this optical system being particularly adapted for printing small or reduced positives from larger negatives. The object plane is indicated as consisting of a horizontal component H and a vertical component V. Naturally the horizontal and vertical components H and V lie in the same plane of the object, such as, for example, a piece of negative film. It will be seen that the horizontal component in the drawing is approximately twice the length of the vertical component and the lens system to be described is particularly adapted to reduce the horizontal component until it is approximately of the same size as the vertical component.

The optical system whose optical axis is indicated at o—o includes three lenses, namely, $L_1$ which is a positive cylindrical lens, $L_2$ which is a spherical photographic lens, and $L_3$ which is a negative cylindrical lens.

For purposes of simplicity, the construction of the optical system illustrated in Fig. 1 will be described in the same order that would be employed in computing or assembling the optical system.

Let us assume that the spherical lens $L_2$ is an ordinary type of photographic lens having a focal length of say 3 inches. The focal length as well as the focus is indicated at $f_2$. As the reduction of the horizontal component H will be made entirely by means of the spherical lens $L_2$, the position of the lens $L_2$ with respect to the image plane at least, can be arbitrarily assumed. For example, the lens $L_2$ may be positioned 9 inches away from the object plane. Knowing the maximum length of the horizontal component H and the length of the image of such horizontal component which it is desired to obtain, the distance between the object plane and the lens and between the lens and the image plane, can be easily determined by well known formulas.

The image of the horizontal component, such image being indicated at $I_h$ may be graphically obtained by permitting parallel light to pass through lens $L_1$ and be focused by $L_2$ upon the image plane, said image plane being determined by a straight line drawn from the end of horizontal component H through the center of $L_2$ to the point of intersection of the parallel beam. Parallel light from horizontal components will not be affected by the cylindrical lens $L_1$ as the axis of curvature $L_1$ lies in a plane passing through H. The same is true of $L_3$. The vertical component V can not (in this example) be reduced to the same extent as H.

For this reason, a cylindrical lens $L_1$ is placed between $L_2$ and the object plane. A virtual image $I_{2v}$ is thus formed of the vertical component V. The location of this component will depend, of course, upon the distance between the object plane and $L_1$. The amount of magnification obtained will depend upon the focal length $f_1$ of $L_1$. It is not necessary that the lens $L_1$ magnify the vertical component V to any predetermined magnification.

If, however, the image $I_h$ is one-half of the horizontal component H, then it is desirable that the virtual image $I_{2v}$ be slightly less than twice the length of the desired final image of the vertical component. In a specific example in which the spherical lens $L_2$ had a focal length of 3 inches and was positioned 9 inches from the object plane, the lens $L_1$ would have a focal length of about 3.5 inches but be positioned about 1 inch from the object plane.

The spherical lens $L_2$ then picks up the virtual image $I_{2v}$ and an actual image indicated at $I_{3v}$ is formed (provided the lens $L_3$ is not included in the system). It will be noticed that the image $I_{3v}$ lies in a different plane than the image $I_h$. In other words, the vertical components in the object plane produce an actual image in one plane whereas the horizontal components of the object plane produce images in a different plane. A system only of $L_1$ and $L_2$, therefore, can not be employed for printing purposes as it would be impossible to obtain accurate and clear-cut images. In order to correct this discrepancy of planes of the images $I_h$ and $I_{3v}$, the negative cylindrical lens $L_3$ is introduced. The size and the desired location of the final image $I_v$ of the vertical component V is known and the location and size of the actual image $I_{3v}$ is known. From these two images, the location of the negative cylindrical lens $L_3$ may be easily determined. After the location of the lens $L_3$ is known, the focal length $f_3$ can be graphically or mathematically determined.

The function of the lens $L_3$, therefore, is to act upon the rays admitted by the lens $L_2$ which tend to form the actual image $I_{3v}$ and transpose such image $I_{3v}$ into the image plane and simultaneously to enlarge such image $I_{3v}$ so that it assumes the desired length.

In this manner, the entire optical system comprising lenses $L_1$, $L_2$ and $L_3$, forms images $I_h$ and $I_v$ in a coincidental plane, the horizontal component $I_h$ having been reduced by the spherical lens $L_2$ whereas the vertical component $V$ has been enlarged by the lens $L_1$, then reduced by the lens $L_2$ and finally enlarged and transposed by the lens $L_3$. The focal length $f_3$ should not be too small and in the example hereinabove given the focal length $f_3$ has been found to give good results when it is of the magnitude of between 2.5 and 3.25 inches. The distance between the lens $L_3$ and the image plane, under those conditions, is about 0.5 to 0.7 inches, giving sufficient room for mechanical devices for moving the film, etc.

The distances between the lenses $L_1$, $L_2$ and $L_3$ are fixed after they have once been adjusted relatively to each other and the entire optical system can then be moved in a body for minor adjustments of focus. A lens system of this type may be composed of the following specific elements: The positive cylindrical lens $L_1$ may have a focal length $f_1$ of 88.9 mm., the lens $L_2$ may be a standard 75 mm. camera lens positioned about 202 mm. from $L_1$. The negative lens $L_3$ may be positioned 98.2 mm. from $L_2$ and have $f=$minus 82.5 mm. With such lens arrangement the object plane is 26.5 mm. from $L_3$.

Fig. 2 diagrammatically illustrates an optical system whereby a photographic transparency of any proportion of height to width may be projected so as to form a clear-cut image on a screen of different proportions of height to width.

For purposes of illustration, the picture of object being projected is substantially square, the horizontal component $H$ being substantially equal to the vertical component $V$. It is desired to produce a projected image which is appreciably wider than high. In other words, the actual image of the horizontal component should be appreciably longer than the image of the vertical component. In the optical system adapted to produce this result, three lenses are employed—a positive cylindrical lens $L_1$ having its axis of curvature at right angles to the horizontal component, a positive spherical lens $L_2$ similar to ordinary projection lenses used in the motion picture industry, and a negative cylindrical lens $L_3$ also having its axis of curvature at right angles to the horizontal components. The plane side of the lens $L_1$ may face the film or object field. The plane side of the negative lens $L_3$ preferably faces the screen on which the image is to be projected. The positive spherical lens $L_2$ is so positioned with respect to the object as to project and form an actual image $I_v$ of the vertical component on the screen. If no other lenses were employed, the horizontal component would lie in the same plane as the plane of the image $I_v$ but it would have proportionately the same length as that in the object.

The positive cylindrical lens is interposed between the object and the spherical lens so as to form an enlarged virtual image $I_{2h}$ of the horizontal component. This virtual image $I_{2h}$ of the horizontal component is picked up by the positive spherical lens $L_2$ and an actual aerial image $I_{3h}$ is formed in a plane differing from that in which the actual image $I_v$ of the vertical component is formed.

In other words, the image on the screen is incomplete and the horizontal components are not in focus in the same plane with the vertical components. This condition is corrected by the introduction of a negative cylindrical lens $L_3$ adapted to act upon the image $I_{3h}$ or the rays by means of which such image is formed. The focal length of the lens $L_3$ is generally quite large and it will be found that the lenses $L_1$ and $L_2$ lie within the focal length of the lens $L_3$. The lens $L_3$ transposes the location of the image $I_{3h}$ to the plane coincidental with the image $L_v$. The geometrical construction of the images is shown in Fig. 2 but it is to be understood that such figure is merely diagrammatically formed and the relative sizes and distances have been exaggerated for purposes of clarity.

The positive cylindrical lens $L_1$ is shown of such focal length $f_1$ that the spherical lens $L_2$ and the negative cylindrical lens $L_3$ lie therewithin. The invention is not limited to the use of cylindrical lenses $L_1$ of such focal length, however.

The focal length of the lens $L_1$ is limited by the amount of magnification desired in the horizontal component $H$ but should not be too long as then there is a tendency for the lens $L_3$ to move out away from the other lenses and increase the length of the optical system to such an extent that in practice the lens $L_3$ would be positioned over the audience of the theatre when such images were being projected. The cylindrical lens $L_1$ must be sufficient to cover the aperture or object field and should be of a character permitting it to be positioned sufficiently away from the object plane to permit mechanical devices such as film gates and the like, to be used.

For purposes of illustration, a specific example of a projection system of this invention is here given. An optical system consisting of a 3½ inch spherical projection lens $L_2$, a positive cylindrical lens $L_1$ having a focal length of about 4.25 inches, and a negative cylindrical lens $L_3$ having a focal length of about $-6.80$, gives good results in projecting a substantially square picture area into a rectangular image having proportions of two to one in width to height. When lenses of this example are employed and the throw of the projection system is about 53 feet, the lens $L_1$ may be positioned at a distance of about 1.56 inches from the object plane, the lens $L_2$ being 0.94 inches from lens $L_1$ and the lens $L_3$ being 2.51 inches from the spherical lens.

The projecting system described hereinabove may be moved as a body for minor adjustments of focus but necessitates independent movement of the negative lens $L_3$ when large changes are to be made. The relation between lenses $L_1$ and $L_2$, however, need not be changed. A specific embodiment of the projection lens system used for a 53 foot throw consisting of a positive cylindrical lens having a focal length of about 108 mm. and a negative cylindrical lens having a focal length of minus 330 mm. Between these two lenses a three and one-half inch projection lens is positioned, this projection lens being about 49 mm. from the positive cylindrical lens and 85.6 mm. from the negative cylindrical lens. The object plane through which the film is passed is about 40.5 mm. from the positive cylindrical lens.

When an optical system such as shown in Fig. 2 is used for projection, it is to be understood that in order to obtain an undistorted final image on the screen, the film or transparency in the object field of such projection lens, should have been first obtained by printing through an optical system capable of deforming or condensing the positive film images to the same extent and in the same proportion that such images are enlarged by the projection system.

The lens systems may be mounted in any suitable mounting. Fig. 3 shows the spherical lens component L₂ carried in a tubular housing 10 into which the housings 11 and 12 are slidably inserted. The housings 11 and 12 may carry lenses L₁ and L₃ respectively. The housing members 11 and 12 may be keyed to the tubular member 10 so as to prevent rotation of the members 10, 11 and 12 relatively to each other, although suitable gears may be carried by the member 10 adapted to mesh with spur gears carried by the members 11 and 12 so that the lenses L₁, L₂ and L₃ may be longitudinally spaced relatively to each other by manipulation of the gears. Details of the mountings are not shown as those skilled in the art will be able to construct suitable mountings without any difficulty.

The entire lens assembly such as is shown in Fig. 3, may supplant the ordinary projection lens or printing lens normally employed.

The change may be effected in a very few minutes. For this reason, the same projecting machine may be employed for projecting ordinary 35 millimeter film as well as 35 millimeter film having condensed images thereon, it being only necessary to take off the normal projection lens and slip on the optical system described hereinabove so as to obtain a larger image on the screen capable of reconstructing the condensed images carried by the film.

It is to be understood that lenses for projection purposes are preferably corrected for chromatic aberration. Chromatic correction is not necessary for the optical systems used in printing purposes. Achromatic lenses are preferably employed for projection, however, so as to prevent the formation of fringes around the images projected. Furthermore, the lens may be corrected for spherical aberration or zonal aberration. The lenses may, if desired, be also corrected for coma. Precise calculations for the correction of lenses need not be given here as such corrections and calculations are within the scope of those skilled in the optical art. Furthermore, it is to be understood that this invention is not limited to the use of any particular types of lenses.

This invention is primarily directed toward the provision of an optical system characterized by the correction for line imagery in the image field. As stated hereinabove, the invention is applicable to projection as well as printing and all such changes and modifications as come within the scope of the appended claims are embraced thereby.

I claim:

1. An optical system adapted for use in projection printing comprising two cylindrical lenses and an intermediate spherical lens positioned along a common optical axis, each of said lenses being provided with one flat face and one curved face, one of said cylindrical lenses being positive and the other negative, the positive cylindrical lens having its flat face facing away from said spherical lens and being adapted to form an enlarged virtual image of vertical components of an object, the spherical lens being adapted to form a reduced image of horizontal components of said object and of the enlarged virtual image of the vertical components, said reduced images being in different planes transverse to the optical axis, and the negative cylindrical lens being adapted to affect and transpose the reduced image of vertical components from its plane into the plane of the reduced horizontal components, said spherical lens lying beyond the focal length of said positive cylindrical lens.

2. An optical system adapted for use in projection printing, comprising two cylindrical lenses and an intermediate spherical lens positioned along a common axis, each of said cylindrical lenses being provided with one flat face and one curved face, one of said cylindrical lenses being positive and the other negative, the positive cylindrical lens having its flat face positioned away from the spherical lens and being adapted to form an enlarged virtual image of vertical components of an object, the spherical lens being adapted to form a reduced image of horizontal components of said object and of the enlarged virtual image of the vertical components, said reduced images being in different planes transverse to the optical axis, the negative cylindrical lens being adapted to affect and transpose the reduced image of vertical components from its plane into the plane of the reduced horizontal components, said spherical lens lying beyond the focal length of said positive cylindrical lens, said spherical lens and negative cylindrical lens being positioned with their focal lengths in overlapping relation.

3. An optical system comprising two cylindrical lenses and an intermediate spherical lens positioned along a common optical axis, each of said cylindrical lenses being provided with one flat face and one curved face, one of said cylindrical lenses being a positive lens adapted to be positioned with its flat face toward an object so as to form an enlarged virtual image of horizontal components of the object; said spherical lens being positioned along the aforesaid optical axis so as to form an actual image of vertical components of the object in one plane transverse to the optical axis, and to form an image of said enlarged virtual image of horizontal components in another transverse plane; the negative cylindrical lens being adapted to transpose the location of the image of horizontal components formed by said spherical lens to a plane coincidental with the image of vertical components formed by said spherical lens.

4. An optical system adapted for use in projection printing, comprising two cylindrical lenses and an intermediate spherical lens positioned along a common optical axis, each of said cylindrical lenses being provided with one flat face and one curved face, one of said cylindrical lenses being positive and the other negative, the curved face of the positive cylindrical lens facing the spherical lens so as to form an enlarged virtual image of vertical components of an object adjacent the flat face of said cylindrical lens, the spherical lens being adapted to form a reduced image of horizontal components of said object and of the enlarged virtual image of the vertical components, said reduced images being in different planes transverse to the optical axis, the negative cylindrical lens having its flat face facing said spherical lens and being adapted to affect and transpose the reduced image of vertical components from its plane into the plane of the reduced horizontal components.

OLINDO O. CECCARINI.